(12) United States Patent
Tsukada

(10) Patent No.: US 12,175,765 B2
(45) Date of Patent: Dec. 24, 2024

(54) OBJECT RECOGNITION APPARATUS AND OBJECT RECOGNITION PROGRAM PRODUCT

(71) Applicant: DENSO CORPORATION, Kariya (JP)

(72) Inventor: Akihiro Tsukada, Kariya (JP)

(73) Assignee: DENSO CORPORATION, Kariya (JP)

( * ) Notice: Subject to any disclaimer, the term of this patent is extended or adjusted under 35 U.S.C. 154(b) by 337 days.

(21) Appl. No.: 17/655,424

(22) Filed: Mar. 18, 2022

(65) Prior Publication Data

US 2022/0207884 A1 Jun. 30, 2022

Related U.S. Application Data

(63) Continuation of application No. PCT/JP2020/033958, filed on Sep. 8, 2020.

(30) Foreign Application Priority Data

Sep. 23, 2019 (JP) .................................. 2019-172398

(51) Int. Cl.
*G06V 20/58* (2022.01)
*G06V 10/60* (2022.01)
(Continued)

(52) U.S. Cl.
CPC .............. *G06V 20/58* (2022.01); *G06V 10/60* (2022.01); *G06V 10/764* (2022.01); *G06V 10/82* (2022.01); *G06V 20/188* (2022.01)

(58) Field of Classification Search
CPC ........ G06V 20/58; G06V 10/82; G06V 20/56; G06V 10/60; G06V 10/751; G06V 10/764;
(Continued)

(56) References Cited

U.S. PATENT DOCUMENTS

2016/0292514 A1* 10/2016 Robinson ............. G06V 10/762
2017/0262735 A1 9/2017 Ros Sanchez et al.
(Continued)

FOREIGN PATENT DOCUMENTS

| DE | 102016220560 A1 * | 4/2018 |
|---|---|---|
| JP | 2021-043044 A | 3/2021 |
| JP | 2021-043679 A | 3/2021 |

OTHER PUBLICATIONS

S. -Y. Tsai, Y. -C. Chang and T. -H. Sang, "SPAD LiDARs: Modeling and Algorithms," 2018 14th IEEE International Conference on Solid-State and Integrated Circuit Technology (ICSICT), Qingdao, China, 2018, pp. 1-4, doi: 10.1109/ICSICT.2018.8565812 (Year: 2018).*

(Continued)

*Primary Examiner* — Aaron W Carter
*Assistant Examiner* — Courtney Joan Nelson
(74) *Attorney, Agent, or Firm* — MASCHOFF BRENNAN

(57) ABSTRACT

An object recognition apparatus recognizes an object existing around a vehicle using an external view camera and a distance measuring sensor. The object recognition apparatus is configured to: acquire, from the external view camera, image information of a camera image, which is generated by sensing incident visible light; acquire, from the distance measuring sensor, image information of a sensor image, the distance measuring sensor generating, as the sensor image, at least one of (i) a reflected light image by emitting near-infrared light and sensing reflected near-infrared light from the object or (ii) a background light image by sensing near-infrared background light with respect to the reflected near-infrared light; and recognize a plant existing around the vehicle with consideration of an intensity difference between an intensity of the camera image and an intensity of the sensor image.

10 Claims, 5 Drawing Sheets

(51) Int. Cl.
*G06V 10/764* (2022.01)
*G06V 10/82* (2022.01)
*G06V 20/10* (2022.01)

(58) Field of Classification Search
CPC .................. G06V 20/64; G06V 20/188; G06T 2207/10028; G06T 2207/30252; G06T 2207/10048; G06T 2207/10152; G06T 2207/10021; G06T 19/006; G06T 2207/30236; G06F 18/00; G06F 18/24; G06F 18/254
See application file for complete search history.

(56) References Cited

U.S. PATENT DOCUMENTS

| | | |
|---|---|---|
| 2018/0336695 A1 | 11/2018 | Fujimura et al. |
| 2019/0114490 A1* | 4/2019 | Sugiura ................ G01S 17/931 |
| 2020/0209401 A1 | 7/2020 | Motoyama et al. |

OTHER PUBLICATIONS

Machine translation of DE-102016220560-A1 (obtained from google patents) (Year: 2018).*
U.S. Appl. No. 17/654,012 and its entire file history, filed Mar. 8, 2022, Tsukada.
U.S. Appl. No. 17/654,015 and its entire file history, filed Mar. 8, 2022, Tsukada.

* cited by examiner

OBJECT RECOGNITION APPARATUS AND OBJECT RECOGNITION PROGRAM PRODUCT

CROSS REFERENCE TO RELATED APPLICATION

The present application is a continuation application of International Patent Application No. PCT/JP2020/033958 filed on Sep. 8, 2020, which designated the U.S. and claims the benefit of priority from Japanese Patent Application No. 2019-172398 filed on Sep. 23, 2019. The entire disclosures of all of the above applications are incorporated herein by reference.

TECHNICAL FIELD

The present disclosure relates to an object recognition apparatus and an object recognition program product.

BACKGROUND

Conventionally, an object recognition device recognizes an object included in an image of a road scene, that is, an object existing around a vehicle.

SUMMARY

The present disclosure provides an object recognition apparatus that recognizes an object existing around a vehicle using an external view camera and a distance measuring sensor. The object recognition apparatus is configured to: acquire, from the external view camera, image information of a camera image, which is generated by sensing incident visible light; acquire, from the distance measuring sensor, image information of a sensor image, the distance measuring sensor generating, as the sensor image, at least one of (i) a reflected light image by emitting near-infrared light and sensing reflected near-infrared light from the object or (ii) a background light image by sensing near-infrared background light with respect to the reflected near-infrared light; and recognize a plant existing around the vehicle with consideration of an intensity difference between an intensity of the camera image and an intensity of the sensor image.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
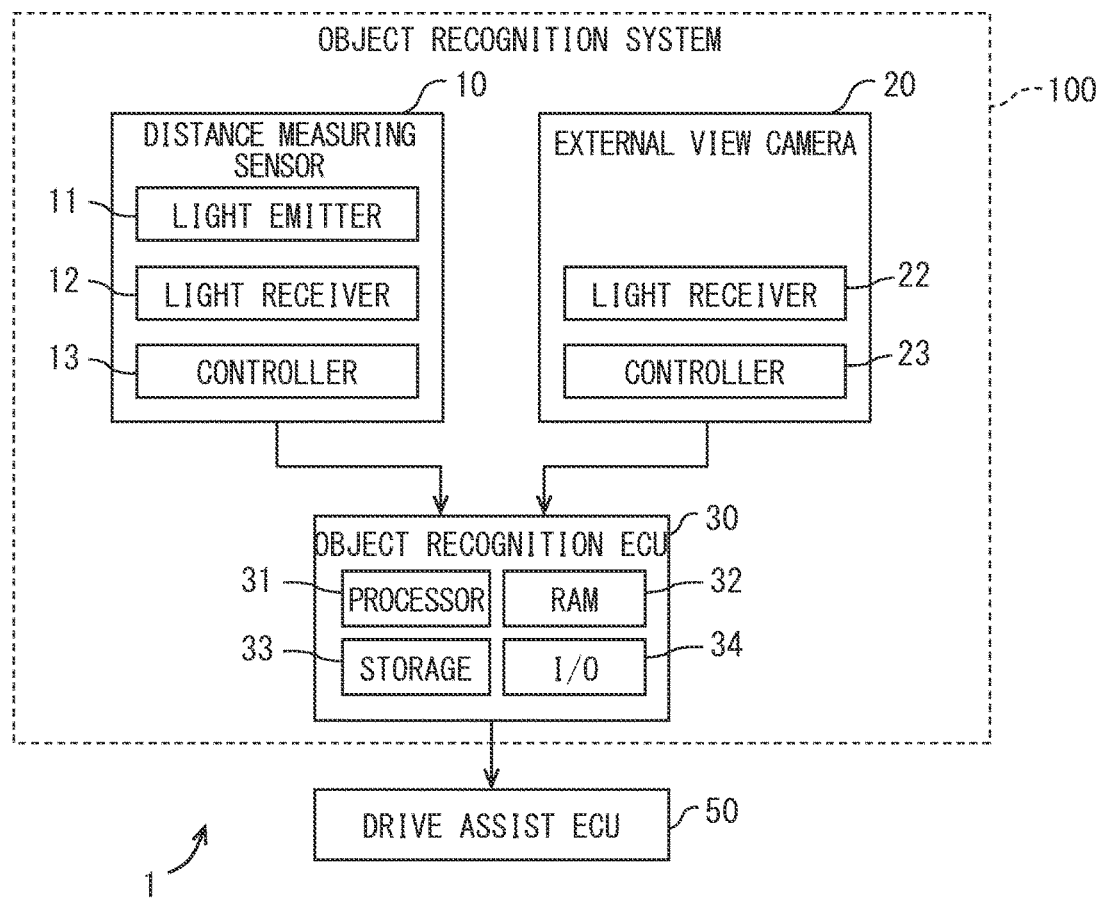
FIG. 1 is a diagram showing an overall configuration of an object recognition system and a driving assist ECU according to a first embodiment of the present disclosure.

There has been known a device that recognizes an object included in an image of a road scene, that is, an object recognition device that recognizes an object existing around a vehicle.

In some situations, plants, such as vegetation on a road side is overgrown and the overgrown part of plants may extend to the road surface, and this may affect the travelling of the vehicle on the road. Specifically, in the object recognition, an influence caused by the object existing on the road on driving operation of a vehicle (for example, the operation selected in autonomous driving of the vehicle) differs depending on whether the object existing on the road is a mere plant or an obstacle for which a collision is required to be avoided.

In some situations, a camera image, which is generated by sensing incident visible light using a camera element, may be used for recognizing the object during an actual travelling of the vehicle. There is a concern that an intensity of visible light, which is included in the camera image, may fail to provide highly accurate recognition between the plant and an obstacle required to be avoided.

According to an aspect of the present disclosure, an object recognition apparatus recognizes an object existing around a vehicle using image information, which includes a camera image acquired from an external view camera and a sensor image acquired from a distance measuring sensor. The external view camera is equipped to the vehicle and generates the camera image by sensing incident visible light with a camera element. The distance measuring sensor is equipped to the vehicle and generates, as the sensor image, a reflected light image by emitting near-infrared light toward a peripheral area and sensing, with a light receiving element, reflected near-infrared light from the object, or generates a background light image by sensing, with the light receiving element, near-infrared background light with respect to the reflected near-infrared light. The object recognition apparatus includes: an image information acquisition unit that acquires the image information of the distance measuring sensor and the image information of the external view camera; and a recognition unit that recognizes a plant existing around the vehicle with consideration of an intensity difference between an intensity of the camera image and an intensity of the sensor image.

According to another aspect of the present disclosure, an object recognition program product stored in a computer-readable non-transitory storage medium is provided. The program product includes instructions to be executed by at least one processor for recognizing an object existing around a vehicle using image information, which includes a camera image acquired from an external view camera and a sensor image acquired from a distance measuring sensor. The instructions includes: acquiring the image information of the distance measuring sensor and the image information of the external view camera, the external view camera being equipped to the vehicle and generating the camera image by sensing incident visible light with a camera element, the distance measuring sensor being equipped to the vehicle and generating, as the sensor image, a reflected light image by emitting near-infrared light toward a peripheral area and sensing, with a light receiving element, reflected near-infrared light from the object, the distance measuring sensor further generating, as the sensor image, a background light image by sensing, with the light receiving element, near-infrared background light with respect to the reflected near-infrared light; and recognizing a plant existing around the vehicle with consideration of an intensity difference between an intensity of the camera image and an intensity of the sensor image.

According to another aspect of the present disclosure, an object recognition apparatus recognizing an object existing around a vehicle using an external view camera and a distance measuring sensor is provided. The object recognition apparatus includes: a non-transitory storage medium; and at least one processor, by executing instructions stored in the non-transitory storage medium, being configured to: acquire, from the external view camera, image information of a camera image, the external view camera being equipped to the vehicle and generating the camera image by sensing incident visible light with a camera element; acquire, from the distance measuring sensor, image information of a sensor image, the distance measuring sensor being equipped to the vehicle and generating, as the sensor image, at least one of a reflected light image or a background light image, the distance measuring sensor generating the reflected light image by emitting near-infrared light toward a peripheral area and sensing, with a light receiving element, reflected near-infrared light from the object, the distance measuring sensor generating the background light image by sensing, with the light receiving element, near-infrared background light with respect to the reflected near-infrared light; and recognize a plant existing around the vehicle with consideration of an intensity difference between an intensity of the camera image and an intensity of the sensor image.

According to the above-described aspects, in the recognition of a plant region that includes a plant, a difference between the intensity of the camera image and the intensity of the sensor image is considered. That is, a difference between the information indicating sensing of visible light in the camera image generated by the external view camera and information indicating sensing of near-infrared light in the sensor image generated by the distance measuring sensor is referred to. For a plant, a spectral characteristic in the visible region tends to be significantly different from a spectral characteristic in the near-infrared region. For an obstacle required to be avoided, a spectral characteristic in the visible region tends to be not significantly different from a spectral characteristic in the near-infrared region. With above configuration of the present disclosure, it is possible to easily recognize the plant from the obstacle to be avoided. Thus, it is possible to perform the object recognition for the plant with high accuracy.

The following will describe embodiments of the present disclosure with reference to accompanying drawings. It is noted that the same reference symbols are attached to the corresponding constituent elements in each embodiment, and redundant explanation may be omitted. In each of the embodiments, when only a part of the configuration is described, the remaining parts of the configuration may adopt corresponding parts of other embodiments. Further, not only the combinations of the configurations explicitly shown in the description of the respective embodiments, but also the configurations of the plurality of embodiments can be partially combined even if they are not explicitly shown if there is no problem in the combinations in particular.

First Embodiment

As shown in FIG. 1, an object recognition apparatus according to a first embodiment of the present disclosure is used for recognizing a peripheral object of a vehicle 1, and is provided by an object recognition electronic control unit (ECU) 30 equipped to the vehicle 1. The object recognition ECU 30 constitutes an object recognition system 100 together with a distance measuring sensor 10 and an external view camera 20. The object recognition system 100 of the present embodiment recognizes an object based on image information from the distance measuring sensor 10 and image information from the external view camera 20, and provides recognition result of the object to a driving assist ECU 50 or the like.

The object recognition ECU 30 is communicably connected to a communication bus of an in-vehicle network mounted on the vehicle 1. The object recognition ECU 30 is one of nodes connected to the in-vehicle network. The distance measuring sensor 10, the external view camera 20, and the driving assist ECU 50 are also connected to the communication bus of the in-vehicle network as nodes The driving assist ECU 50 mainly includes a computer equipped with a processor, random access memory (RAM), a storage unit, an input/output interface, and a bus connecting these elements. The driving assist ECU 50 includes at least one of a driving assist function that assists the driver's driving operation of the vehicle 1 or a substitute driving function that substitutes the driver's driving operation of the vehicle 1. The driving assist ECU 50 executes programs stored in a storage with a processor. By executing the programs, the driving assist ECU 50 performs an autonomous driving or an advanced driving assist of the vehicle 1 according to the recognition result of object existing around the vehicle 1. Herein, the recognition result of object is provided by the object recognition system 100. As the autonomous driving or advanced driving assist of the vehicle 1 based on the object recognition result, an object recognized as a pedestrian or another vehicle may be assigned with the highest priority in collision avoidance assist compared with an object recognized as a plant.

The following will describe details of the distance measuring sensor 10, the external view camera 20, and the object recognition ECU 30 included in the object recognition system 100.

The distance measuring sensor 10 may be provided by a single photon avalanche diode light detection and ranging (SPAD LiDAR) disposed on a front portion of the vehicle 1 or on a roof of the vehicle 1. The distance measuring sensor 10 measures at least a front range MA1 of the vehicle 1 among a peripheral area of the vehicle 1. The front range MA1 measured by the distance measuring sensor 10 is also referred to as a front measurement range MA1.

Figure 2:
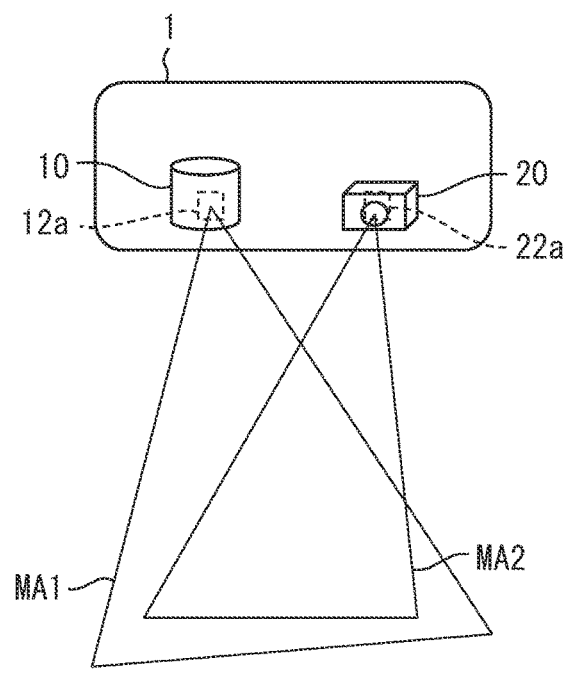
FIG. 2 is a diagram showing a distance measuring sensor and an external view camera mounted to a vehicle according to the first embodiment.

The distance measuring sensor 10 includes a light emitter 11, a light receiver 12, a controller 13, and the like. The light emitter 11 emits a light beam from a light source toward the measurement range MA1 as shown in FIG. 2 by scanning the measurement range using a movable optical member, such as a polygon mirror. For example, the light source may be a semiconductor laser, such as a laser diode. The light source emits, corresponding to an electric signal provided by the controller 13, the light beam of near infrared region. The light beam of near infrared region is invisible to an occupant, such as a driver in the vehicle and other people outside of the vehicle.

The light receiver 12 collects, within the measurement range MA1, the reflected light from the object or background light relative to the reflected light by, for example, a condenser lens, and controls the collected light beam to be enter a light receiving element 12a.

The light receiving element 12a converts the received light into an electric signal by photoelectric conversion. The light receiving element 12a may be provided by a SPAD light receiving element that has a high sensitivity by amplifying a detection voltage. For example, the light receiving element 12a may be provided by a CMOS sensor that has a high sensitivity in the near infrared region compared with the visible region for detecting the reflected light of the near infrared region. This sensitivity of the light receiving element 12a may be adjusted by providing an optical filter in the light receiver 12. The light receiving element 12a has multiple light receiving pixels arranged as an array in one-dimensional direction or two-dimensional directions.

The controller 13 controls operations of the light emitter 11 and the light receiver unit 12. For example, the controller 13 may be arranged on a common substrate together with the light receiving element 12a. The controller 13 mainly includes a broad-meaning processor, such as a microcomputer or a field-programmable gate array (FPGA). The controller 13 has a scanning control function, a reflected light measuring function, and a background light measuring function.

The scanning control function is a function for controlling scanning of light beam. The controller 13 oscillates the light beam emitted from the light source by multiple times to have a pulse shape based on an operating clock of a clock oscillator included in the distance measuring sensor 10, and operates the movable optical member.

The reflected light measuring function is a function of reading out, according to the scan timing of the light beam, a voltage value corresponding to the reflected light received by each light receiving pixel with, for example, a rolling shutter method, and measuring an intensity of the received reflected light. In the measurement of the reflected light, a distance from the distance measuring sensor 10 to the object on which the light beam is reflected can be measured by detecting a time difference between the emission time of the light beam and the receiving time of the reflected light. By measuring the reflected light, the controller 13 generates, as the reflected light image, image data in which the intensity of the reflected light is associated with the distance information of the object on which the emitted light beam is reflected in two-dimensional coordinates corresponding to the measurement range MA1.

The background light measurement function is a function of reading out a voltage value corresponding to the background light received by each light receiving pixel at a time point immediately before measuring of the reflected light, and measuring the intensity of the background light. Here, the background light is incident light entering the light receiving element 12a from the measurement range MA1 among the external area, and does not include the reflected light. The incident light includes natural light, display light emitted from an external display, and the like. By measuring the background light, the controller 13 can generate, as the background light image, image-like data in which the intensity of the background light is associated with the two-dimensional coordinates corresponding to the measurement range MA1.

The reflected light image and the background light image are sensed by the same light receiving element 12a, and acquired from the same optical system including the light receiving element 12a. Therefore, the reflected light image and the background light image mainly include measurement results of light in the near-infrared region, which is common to the reflected light image and the background light image. Thus, the coordinate system of the reflected light image can be regarded as the same and coincident coordinate system as the coordinate system of the background light image. Furthermore, there is almost no difference between the measurement time of the reflected light image and the measurement time of the background light image. For example, the time difference may be less than 1 nanosecond. Thus, the reflected light image and the background light image can be regarded as synchronized images.

In the present embodiment, the integrated image data in which three data channels including the intensity of the reflected light, the distance of the object, and the intensity of the background light are stored for each pixel is successively output to the object recognition ECU 30 as the sensor image.

The external view camera 20 may be a camera arranged in a vehicle compartment close to a front windshield of the vehicle 1. The external view camera 20 is able to measure at least a measurement range MA2 set in front of the vehicle on external side. More specifically, the measurement range MA2 is set to at least partially overlap with the measurement range MA1 of the distance measuring sensor 10.

The external view camera 20 includes a light receiver 22 and a controller 23. The light receiver 22 collects incident light (background light) from the measurement range MA2 of external area by, for example, a light receiving lens, and controls the collected light to enter a camera element 22a.

The camera element 22a converts light into an electric signal by photoelectric conversion. For example, a CCD sensor or a CMOS sensor can be adopted as the camera element 22a. The camera element 22a is set to have high sensitivity in the visible region compared with the near infrared region in order to efficiently receive natural light in the visible region. The camera element 22a has multiple light receiving pixels (corresponding to sub-pixels) arranged as an array in two-dimensional directions. For example, different color filters, such as red, green, and blue color filters may be arranged on the light receiving pixels adjacent to one another. These color filters adjust the wavelength characteristic of the sensitivity of the entire camera element 22a and adjust the wavelength characteristic of the sensitivity of each light receiving pixel of the camera element 22a. Each light receiving pixel receives visible light of one color corresponding to the arranged color filter. By respectively measuring the intensity of red light, the intensity of green light, and the intensity of blue light, the camera image captured by the external view camera 20 has a higher resolution compared with the reflected light image and the background light image. The camera image is a visible color image.

The controller 23 controls operations of the light receiver 22. For example, the controller 23 may be arranged on a common substrate together with the camera element 22a. The controller 23 mainly includes a broad-meaning processor, such as a microcomputer or a FPGA. The controller 23 has an image capturing function.

The image capturing function is a function for capturing a color image as described above. The controller 23 reads out, according to an operating clock of a clock oscillator included in the external view camera 20, a voltage value corresponding to the incident light received by each light receiving pixel using, for example, a global shutter method, and measures an intensity of the sensed incident light. The controller 23 can generate, as a camera image, image-like data in which the intensity of incident light is associated with the two-dimensional coordinates corresponding to the measurement range MA2. Such camera images are successively output to the object recognition ECU 30.

The object recognition ECU 30 is an electronic control device that recognizes an object existing around the vehicle 1 by using image information from the distance measuring sensor 10 and image information from the external view camera 20. As shown in FIG. 1, the object recognition ECU 30 mainly includes a computer equipped with a processor 31, a RAM 32, a storage 33, an input/output interface 34, and a bus connecting these elements. The processor 31 is combined with the RAM 32, and is provided by a hardware for executing an arithmetic processing. The processor 31 includes at least one arithmetic core, such as a central processing unit (CPU), a graphical processing unit (GPU), or a reduced instruction set computer (RISC). The processor 31 may further include an FPGA and an IP core having different dedicated functions. The processor 31 executes, by accessing the RAM 32, various processes for functioning as the functional blocks described later. The storage 33 includes a non-volatile storage medium. The storage 33 stores various programs (image registration program, object recognition program, etc.) to be executed by the processor 31.

Figure 3:
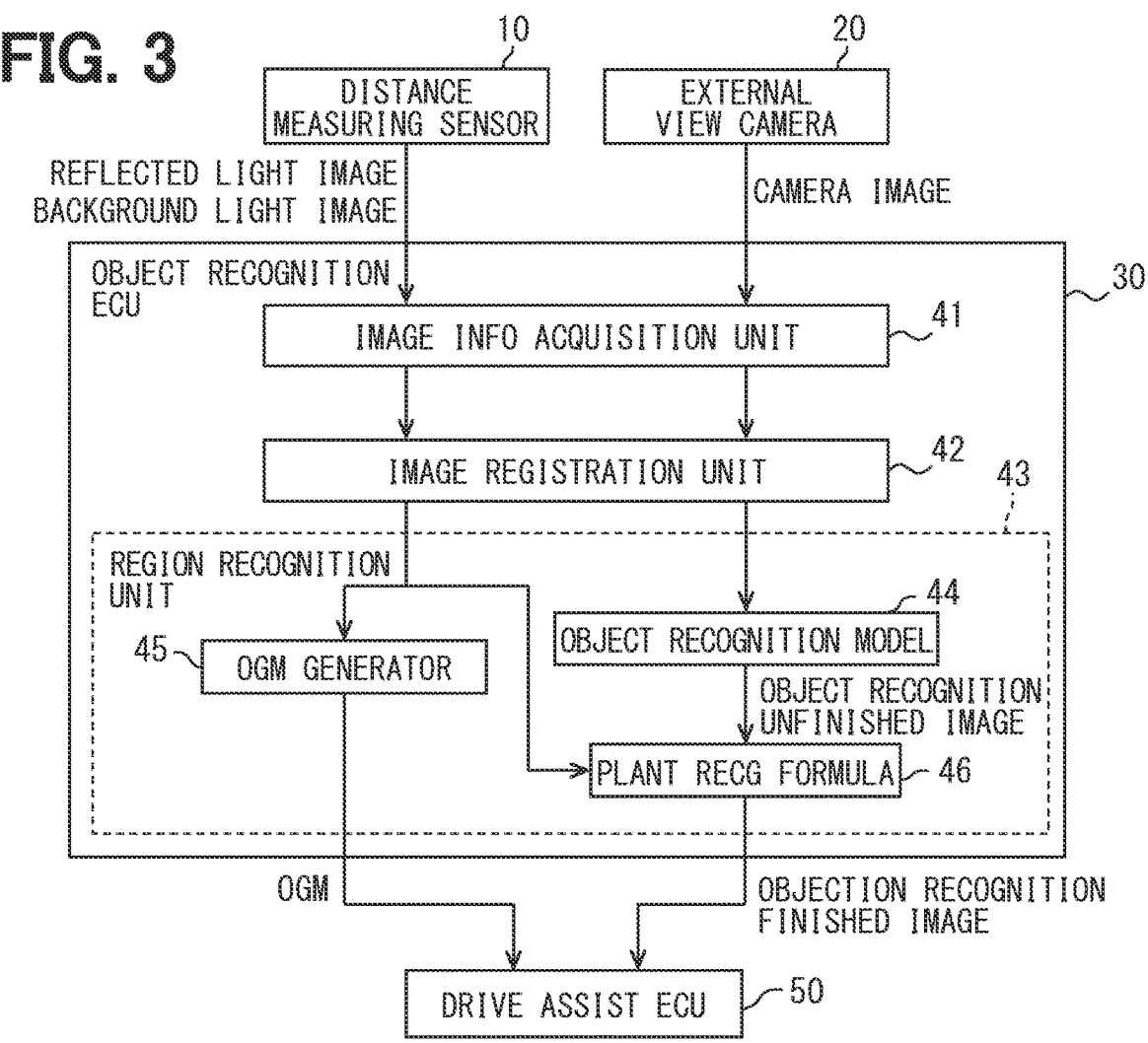
FIG. 3 is a diagram showing a configuration of an object recognition ECU according to the first embodiment.

The object recognition ECU 30 includes functional blocks, and the functional blocks are provided by the processor 31 executing the programs stored in the storage 33. Specifically, as shown in FIG. 3, the functional blocks include an image information acquisition unit 41, an image registration unit 42, and a region recognition unit 43.

The image information acquisition unit 41 acquires, from the distance measuring sensor 10, the reflected light image and the background light image as image information. The image information acquisition unit 41 acquires, from the external view camera 20, the camera image as the image information. The image information acquisition unit 41 further acquires, as the image information, information related to the wavelength characteristic of the sensitivity of the camera element 22a (hereinafter referred to as wavelength characteristic information). Instead of acquiring the wavelength characteristic information from the camera image every time the image is captured, the wavelength characteristic information of the external view camera 20 may be stored in the storage 33 when the wavelength characteristic information is acquired from the external view camera 20 when initial setting is carried out to the external view camera 20. Then, the wavelength characteristic information may be acquired by accessing to the storage 33. The image information acquisition unit 41 provides the image registration unit 42 with the latest set of the reflected light image, the background light image, and the camera image.

The image registration unit 42 specifies a correspondence relationship between (i) the coordinate system of the reflected light image and the background light image and (ii) the coordinate system of the camera image. That is, the image registration unit 42 performs image registration.

Then, the image registration unit 42 provides, to the region recognition unit 43, the reflected light image, the background light image, and the camera image, to which image registration is carried out.

The region recognition unit 43 recognizes a spatial region including an object existing around the vehicle 1. The region recognition unit 43 can recognize, in particular, the plants included in the camera image in consideration of a difference between the intensity of the camera image and the intensity of the background light image. The region recognition unit 43 has a visible object recognition function, a peripheral space map generation function, and a plant recognition function.

The visible object recognition function is a function for recognizing an object on a pixel-by-pixel basis by semantic segmentation on the camera image having visible light intensity distribution information. The storage 33 includes an object recognition model 44, and the object recognition model mainly includes a neural network as one component of the object recognition program. The object recognition model 44 is a trained artificial intelligence (AI) model, and outputs an object recognition unfinished image Im1 (see FIG. 4) in response to an input of the camera image.

The neural network may adopt a full-layer convolutional neural network (FCN), an encoder/decoder network in which an encoder and a decoder are combined (for example, SegNet, U-Net, PSPNet), or the like.

The following will describe an example in a case where the encoder/decoder network is adopted as the neural network. The encoder performs a convolution operation and a pooling operation to the input camera image. The encoder down-samples the camera image and extracts features of the camera image. For example, the encoder may output, to the decoder, a feature map and a probability of class that classifies the objects.

Figure 4:
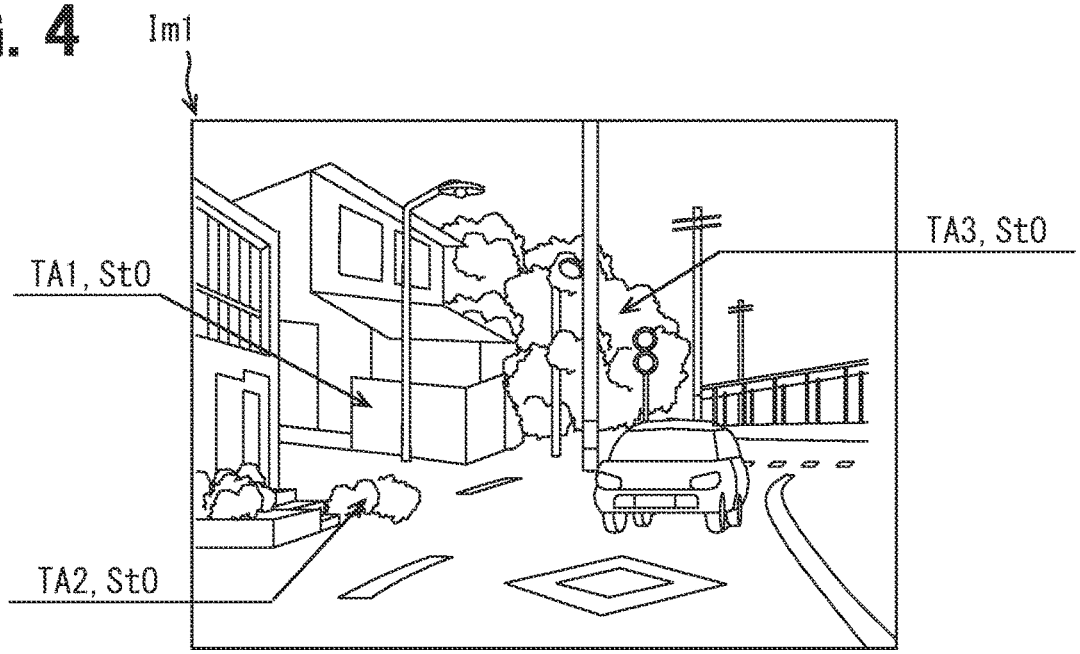
FIG. 4 is a diagram showing an object recognition unfinished image and an object classification state in the object recognition unfinished image according to the first embodiment.

The decoder performs, using data input by the encoder, a reverse pooling operation and a deconvolution operation. By up-sampling the camera image, which has been down-sampled by the encoder, the decoder can output an object recognition unfinished image Im1 (refer to FIG. 4) for each region or for each pixel of the image. Herein, the region is divided corresponding to the object included in the camera image, and corresponds to a partial region of the camera image. Note that FIG. 4 shows only the classification state of an exemplary class related to the plants for explanation purpose.

In the first embodiment, objects having high classification necessity for travelling of the vehicle 1, such as a pedestrian, another vehicle, or a road are set as a class, and an object, such as a plant or the like is not set as a class. In the semantic segmentation, together with objects that are difficult to be recognized and have low necessities of classification, the plant is classified into a superordinate concept class of motionless object StO (see FIG. 4) and obstacle.

It is difficult to accurately recognize the plant by semantic segmentation using the camera image, which is a color image of visible light. For example, the green plant is distinguished substantially based on intensity information of green light in the color image. Therefore, the green plant and objects having green colors, such as an object painted in green color, a green traffic light, or the like may have recognition errors. In order to ensure the accuracy of the output result from the object recognition model 44, that is, to suppress the occurrence of misclassification of green plants, objects painted in green color, green traffic light, or the like are classified into the same class. The same class is also referred to as a common class in which the objects are included in common.

In the first embodiment, the object recognition model 44 may adopt, as a learning method, a supervised learning. The teaching data in supervised machine learning includes multiple data sets, each of which includes the camera image, which corresponds to input data, and an object recognition finished image Im2 (see FIG. 5), which corresponds to output data (correct answer data).

The peripheral space map generation function is a function of inputting, to an OGM generator 45, the reflected light image and the background light image, and generating a map in which occupied state information of an object is added to a peripheral space of the vehicle 1. The region recognition unit 43 generates, using an occupancy grid map (OGM) generation method, a map indicating the peripheral space of the vehicle. In the present disclosure, the map indicating the peripheral space of the vehicle is also referred to as OGM for simplification. The OGM may be represented by a coordinate system having a viewpoint over the vehicle 1 in bird's-eye view.

Specifically, in the OGM, a region between the distance measuring sensor 10 and the object included in the reflected light image, which is specified based on the distance information, is not occupied by the object, and this region is set as an unoccupied region. The position of the object included in the reflected light image is set as an occupied region. In the reflected light image, a region in a direction away from the object and the vehicle is set as an uncertain region in which the occupied state cannot be determined.

Figure 5:
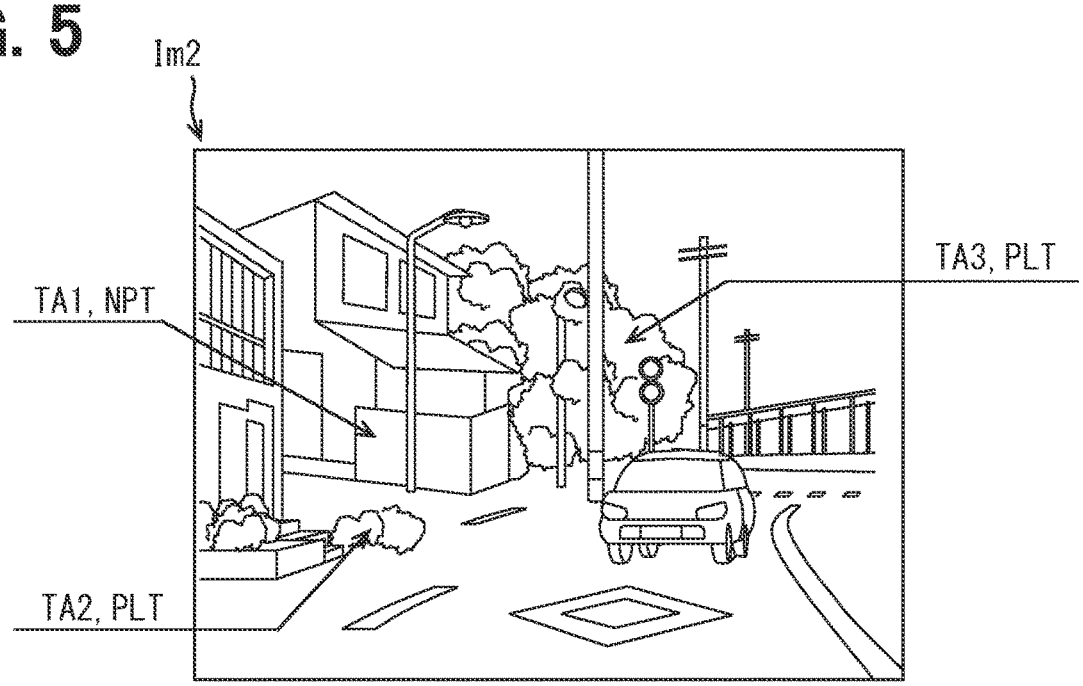
FIG. 5 is a diagram corresponding to FIG. 4 and showing an object recognition finished image and an object classification result in the object recognition finished image according to the first embodiment.

In the plant recognition function, as shown in FIG. 5, each recognition target region TA1, TA2, TA3 of the object recognition unfinished image Im1 to which the same class information, such as same color information is added is classified into a plant region PLT in which a plant is included or a non-plant region in which no plant is included. The region recognition unit 43 recognizes the plant region PLT in consideration of at least one of (i) a difference between the intensity of camera image and the intensity of reflected light image or (ii) a difference between the intensity of camera image and the intensity of background light image. In the present embodiment, as an example, the plant region PLT is recognized in consideration of the difference between the intensity of camera image and the intensity of background light image.

The region recognition unit 43 calculates a determination value, using a plant recognition formula 46, based on intensities of corresponding pixels included in each recognition target region TA1, TA2, TA3 in both of the camera image and in the background light image. The corresponding pixels are specified by the image registration of the camera image and the background light image, and indicate the same position. The region recognition unit 43 changes the form of the plant recognition formula 46 according to the wavelength characteristic of the sensitivity of the camera element 22a acquired by the image information acquisition unit 41.

Figure 6:
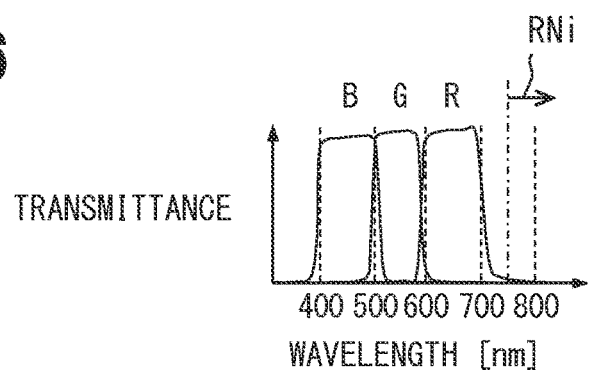
FIG. 6 is a diagram schematically showing an example of a wavelength characteristic of a transmittance of a color filter that can be used in the external view camera of the first embodiment.

As shown in FIG. 6, when the red color filter in the light receiving pixel of the camera element 22a substantially blocks near infrared light, the plant recognition formula 46 shown in the following calculation formula 1 is adopted.

$$Q = Ib/(1 - Ic) \qquad \text{(Formula 1)}$$

Herein, Q is the determination value, Ib is the intensity of the corresponding pixel of the background light image, and Ic is the intensity of the corresponding pixel of the camera image. The intensity is a sum of red light intensity, green light intensity, and blue light intensity.

Figure 7:
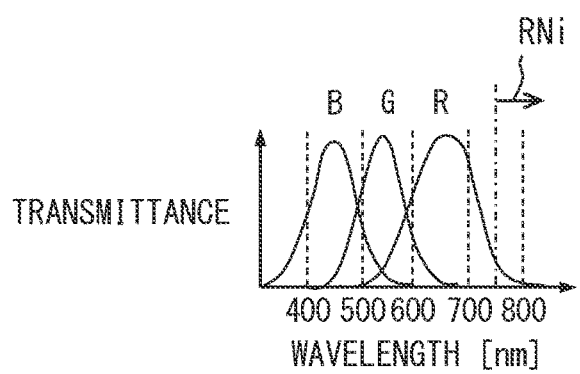
FIG. 7 is a diagram schematically showing another example of a wavelength characteristic of a transmittance of a color filter that can be used in the external view camera of the first embodiment.

As shown in FIG. 7, when the red color filter in the light receiving pixel of the camera element 22a partially transmits near-infrared light, that is, does not sufficiently block the near-infrared light, the plant recognition formula 46 shown in the following calculation formula 2 is adopted.

$$Q = Ib/(1 - Igb) \qquad \text{(Formula 2)}$$

Herein, Igb is the intensity of the corresponding pixel of the camera image, and the intensity is a sum of the green light intensity and blue light intensity. When the camera image to which the semantic segmentation is to be performed includes two channels of data, that is, an R image (an image based on red light intensity) and a GB image (an image based on green light intensity and blue light intensity), Igb is the intensity of the corresponding pixel of GB image included in the camera image.

It should be noted that Ic and Igb are intensities standardized to have values within a range of 0 to 1. In the standardized intensity, 0 indicates the minimum intensity (the camera element 22a detects no incident light), and 1 indicates the maximum intensity (the camera element 22a detects the maximum amount of incident light). Further, Ib may be standardized to have a value within a range of 0 to 1, similar to Ic and Igb.

The determination value Q has a physical quantity that reflects the difference between the intensity of the camera image and the intensity of the background light image, and is calculated using the plant recognition formula 46 according to an intensity ratio between the camera image and the background light image.

The following will describe an example of plant recognition. When an average value of the calculated determination values Q in one recognition target region is equal to or higher than a predetermined reference value, the region recognition unit 43 determines that the target region is the plant region PLT (see TA2 and TA3 in FIG. 5). The predetermined reference value is set to indicate a probability that a plant is included in the region is higher than a predetermined level (for example, 50%). When the average value is less than the reference value, the region recognition unit 43 determines that the recognition target region is the non-plant region NPT (see TA1 in FIG. 5).

Figure 8:
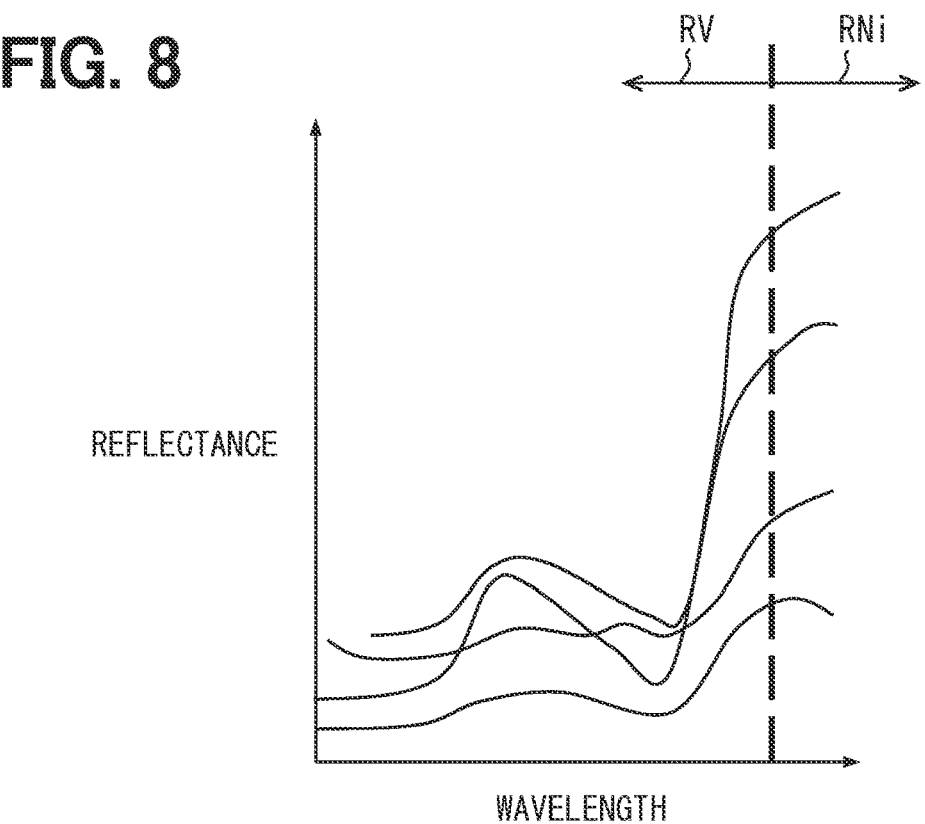
FIG. 8 is a diagram schematically showing wavelength characteristics of reflectances of four types of plants.

As shown in FIG. 8, in spectral characteristics of plants, the reflectance in the near-infrared region RNi tends to be remarkably larger than the reflectance in the visible region RV for each spectral characteristic. In spectral characteristics of non-plant green colored objects, such as an object painted in green or a green traffic light, the reflectance in the visible region RV and the reflectance in the near infrared region RNi tend to be changeless. By using this reflectance difference in different regions, it is possible to recognize the plant region PLT and the non-plant region NPT. Specifically, when the object is a plant, the reflectance in near-infrared region RNi is significantly higher than the reflectance in visible region RV. Thus, the intensity of the background light image generated by detected infrared light is significantly larger than the intensity of camera image generated by detected visible light. Therefore, when the object included in the camera image is a plant, the determination value Q is probably high depending on the ratio between the reflectance in the visible region RV and the reflectance in the near infrared region RNi.

As described above, the region recognition unit 43 outputs the object recognition finished image Im2 in which the recognition information of the plant region PLT is added to the object recognition unfinished image Im1. The region recognition unit 43 may feedback the recognition result of plant region PLT to the OGM. For example, the region recognition unit 43 may set the occupied region in the OGM, which corresponds to the plant region PLT in the camera image, as an entrance allowed region of the vehicle 1 to which entrance of vehicle is allowed. The region recognition unit 43 may set the occupied region in the OGM, which corresponds to the non-plant region NPT in the camera image, as an entrance forbidden region of the vehicle 1 to which entrance of vehicle is forbidden.

As described above, the region recognition unit 43 classifies, based on the camera image, the objects included in the camera image into multiple different classes by the visible object recognition function. In the classification of objects into multiple different classes, plants are classified together with other objects into the same class that is superordinate concept class of the plants. Then, the region recognition unit 43 determines whether the object included in the same class is a plant by the plant recognition function in consideration of the difference between the intensity of the camera image and the intensity of the background light image. The object recognition information including the object recognition finished image Im2 and the OGM, which are generated as described above, is provided to the driving assist ECU 50.

Figure 9:
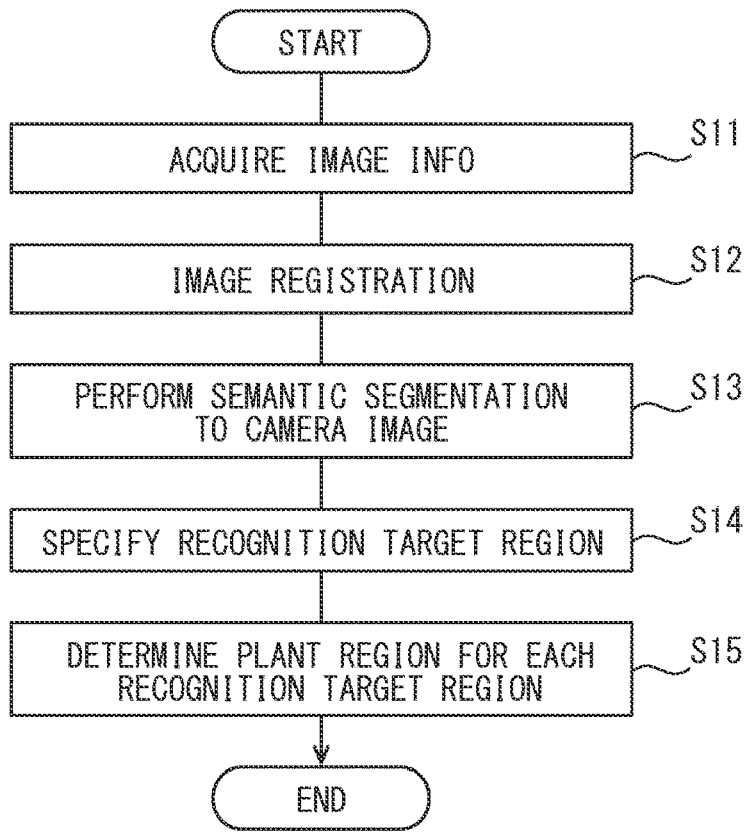
FIG. 9 is a flowchart showing a process executed by the object recognition ECU according to the first embodiment.

The following will describe an object recognition method for recognizing an object existing around the vehicle 1 based on the object recognition program with reference to the flowchart shown in FIG. 9 according to the first embodiment. The process shown in the flowchart may be repeatedly executed, for example, at predetermined time intervals.

In S11, the image information acquisition unit 41 acquires, from the distance measuring sensor 10, the reflected light image and the background light image as image information. The image information acquisition unit 41 acquires, from the external view camera 20, the camera image as the image information. After the process in S11, the process proceeds to S12.

In S12, the image registration unit 42 performs image registration to (i) the reflected light image and the background light image and (ii) the camera image. After the process in S12, the process proceeds to S13.

In S13, the region recognition unit 43 performs semantic segmentation on the camera image. Green colored objects, such as green plants, object painted in green, and green traffic lights, or the like are classified into the same class. The region recognition unit 43 generates the OGM from the reflected light image and the background light image. The generation of OGM may be carried out at the same time with the classification of green colored objects, or may be carried out before or after the classification of green colored objects. After the process in S13, the process proceeds to S14.

In S14, the region recognition unit 43 specifies, from the camera image, the recognition target regions to which same classification class information is added. The number of recognition target regions may be zero, one, or multiple. After the process in S14, the process proceeds to S15.

In S15, the region recognition unit 43 determines whether the recognition target region is the plant region PLT or the non-plant region NPT by using the plant recognition formula 46 for each recognition target region. After S15, the process is ended.

In the present embodiment, the region recognition unit 43 corresponds to a recognition unit that recognizes the plant existing around the vehicle 1.

(Operation Effects)

Operation effects of the first embodiment will be described below.

In the first embodiment, when recognizing the plant region PLT in which a plant is included, the difference between the intensity of camera image and the intensity of sensor image is considered. That is, a difference between the information indicating sensing of visible light in the camera image generated by the external view camera 20 and information indicating sensing of near-infrared light in the image generated by the distance measuring sensor 10 is referred to. As described above, the spectral characteristic of the plant in the visible region RV is significantly different from the spectral characteristic of the plant in the near-infrared region RNi, and the spectral characteristic of an object to be avoided in the visible region RV is not significantly different from the spectral characteristic of the object to be avoided in the near-infrared region RNi. With above configuration, it is possible to easily recognize the plant from the object to be avoided. Thus, it is possible to provide the object recognition ECU 30 as the object recognition apparatus capable of recognizing plants with high accuracy.

In the first embodiment, the objects reflected in the camera image are classified into multiple different classes based on the camera image. In the classification based on the camera image which is generated by the camera element 22*a* sensing the visible light, the plants are classified, together with other objects, into the same superordinate concept class of the plants. Thus, classification error can be avoided. Then, the objects classified into the same class is determined to be a plant or not in consideration of the difference between the intensity of camera image and the intensity of sensor image. That is, the objects are classified by suppressing the occurrence of misclassification, and then the plants are recognized with high accuracy from other objects included in the same class. In the above configuration, the information sensed by the near-infrared light of the distance measuring sensor 10 is applied to partial objects instead of all of the objects. Thus, high accuracy recognition of plants can be provided with reduced processing load and increased processing speed.

In a situation where object recognition is required in real time, such as during a travelling of the vehicle 1, object recognition that enables high-precision recognition of plants with reduced processing load, that is, processing amount and increases processing speed can improve user experience.

In the first embodiment, the objects are classified into multiple different classes by performing semantic segmentation using the object recognition model 44 having the neural network. Since the object included in the camera image is classified for each pixel by the semantic segmentation, the spatial region in which the object is located can be recognized with high accuracy.

In the first embodiment, the plant is recognized based on the determination value calculated by the plant recognition formula 46 according to the intensity ratio between the camera image and the sensor image. In the above plant recognition formula 46, the tendency of the spectral characteristic of the plant is remarkably expressed, thereby highlighting the existence of plant. Thus, the recognition accuracy of the plants can be significantly improved.

In the first embodiment, the plant recognition formula 46 is changed according to the wavelength characteristic information of the sensitivity of the camera element 22a. Thus, corresponding to the wavelength characteristic information of the sensitivity of the camera element 22a, for example, corresponding to the sensitivity in the near-infrared region RNi, the determination value calculated by the plant recognition formula 46 can be changed to a value in which the tendency of the spectral characteristics of the plant is prominently expressed.

Second Embodiment

Figure 10:
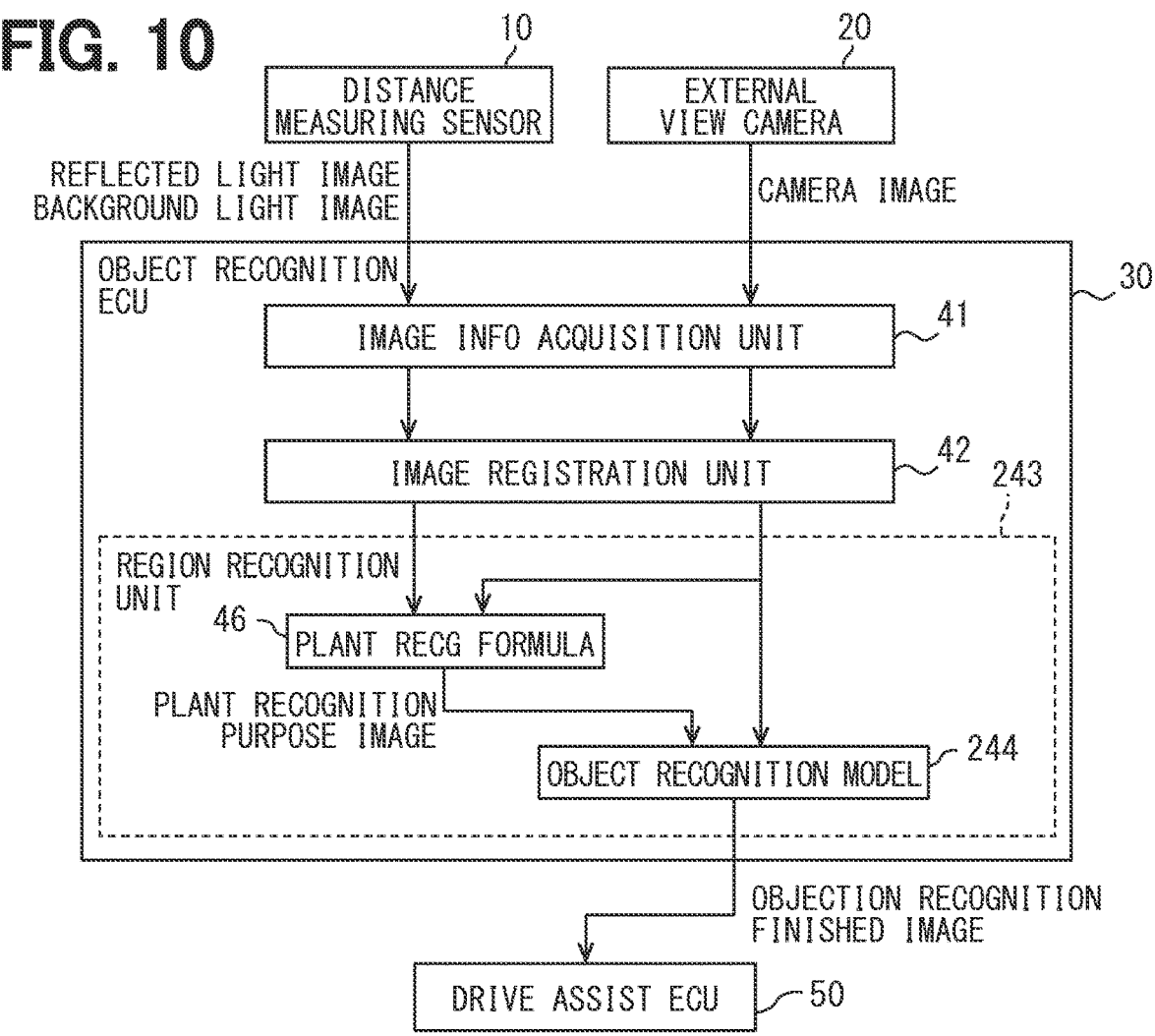
FIG. 10 is a diagram showing a configuration of an object recognition ECU according to a second embodiment.
Figure 11:
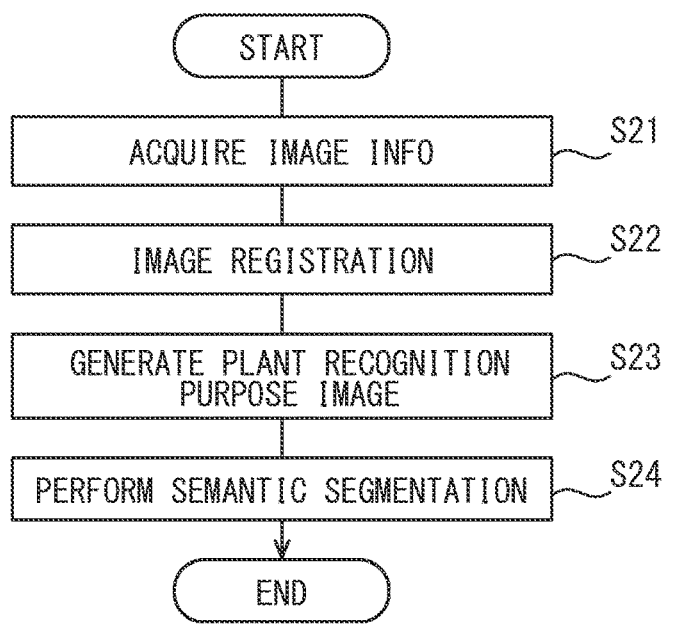
FIG. 11 is a flowchart showing a process executed by the object recognition ECU according to the second embodiment.

As shown in FIG. 10 and FIG. 11, the second embodiment is a modification of the first embodiment. The second embodiment will be described focusing on differences from the first embodiment.

A region recognition unit 243 of the second embodiment shown in FIG. 10 has a plant recognition purpose image acquisition function and an object recognition function.

The plant recognition purpose image acquisition function is a function for acquiring plant recognition purpose image. Similar to the first embodiment, the region recognition unit 243 acquires the plant recognition purpose image by generating the plant recognition purpose image using the plant recognition formula 46. For example, the region recognition unit 243 prepares two-dimensional coordinate data having the same coordinate system as the camera image. The region recognition unit 243 calculates the determination value Q using the plant recognition formula 46 based on the intensity of the corresponding pixel in the camera image and the intensity of the corresponding pixel in the background light image. The corresponding points in the camera image and the background light image are associated with one another by specifying two-dimensional coordinate data as coordinates representing the same position by image registration.

As a result, the plant recognition purpose image in which the information of the determination value Q is added to each coordinate of the two-dimensional coordinate data is generated. The plant recognition purpose image is image data having the same coordinate system as the camera image, and has distribution information of the discrimination value Q. In the plant recognition purpose image, although the determination value Q of the region where the plant is included tends to be high due to the spectral characteristic of the plant described in the first embodiment, the determination value Q of the region where the object other than the plant is included may also be high due to the spectral characteristic of the object similar to that of the plant. Thus, compared with a case where the plant recognition purpose image is used alone, the plant recognition accuracy is substantially improved by using a further object recognition model 244, which will be described later.

In the object recognition function, the semantic segmentation is carried out to the camera image having visible light intensity distribution information. In the semantic segmentation, the plant recognition purpose image, which has determination value distribution information of the visible light and the infrared light, is used. The object recognition function executes the object recognition for each pixel. The storage 33 includes the object recognition model 244, and the object recognition model mainly includes a neural network as one component of the object recognition program. The object recognition model 244 of the second embodiment may be a trained AI model. When the camera image and the plant recognition purpose image are input to the model, the object recognition finished image Im2 to which class classification information is added is output from the model.

As the neural network, basically, a network having the same structure as that of the first embodiment can be adopted. However, it is necessary to make changes such as increasing the number of channels of the convolution layers in the encoder in response to the increase in the input parameters of the plant recognition purpose image.

In the second embodiment, different classes are set corresponding to plants, pedestrians, other vehicles, roads. In the semantic segmentation, plants are classified as a separate category, which is separate from the objects that are difficult to be recognized and have low necessities of classification. Thus, in the object recognition finished image output from the object recognition model 244, the plant is already recognized with high accuracy.

In the second embodiment, the object recognition model 244 may adopt, as a learning method, a supervised learning. The teaching data in supervised machine learning includes multiple data sets, each of which includes the camera image and the object recognition purpose image, which correspond to input data, and the object recognition finished image Im2, which corresponds to output data (correct answer data).

As described above, the region recognition unit 243 generates the plant recognition purpose image that includes the difference between the intensity of camera image and the intensity of background light image by the plant recognition purpose image acquisition function. Then, the region recognition unit 243 classifies the objects included in the camera image into different classes based on the camera image and the plant recognition purpose image by the object recognition function. In the classification of objects into different classes, plants are classified into a single class.

The following will describe an object recognition method for recognizing an object existing around the vehicle 1 based on the object recognition program with reference to the flowchart shown in FIG. 11 according to the second embodiment. The process in the flowchart may be repeatedly executed, for example, at predetermined time intervals.

The process executed in S21 and S22 are the same as S11 and S12 of the first embodiment. After the process in S22, the process proceeds to S23.

In S23, the region recognition unit 243 generates the plant recognition purpose image based on the camera image and the background light image by using the plant recognition formula 46. After the process in S23, the process proceeds to S24.

In S24, the region recognition unit 243 inputs the camera image and the plant recognition purpose image into the object recognition model 244, and performs the semantic segmentation. Green colored objects, such as green plants, object painted in green, and green traffic lights, or the like are classified into different classes. After S24, the process is ended.

In the second embodiment described above, based on the camera image and the sensor image, the plant recognition purpose image including the difference between the intensity of camera image and the intensity of sensor image is generated. Then, based on the camera image and the plant recognition purpose image, the objects included in the camera image are classified into different classes. In the classification of objects into different classes, plants are classified into a single class. Thus, the plant can be identified by a comprehensive determination using both of the camera image and the plant recognition purpose image, thereby improving the recognition accuracy of the plant.

In the present embodiment, the region recognition unit 243 corresponds to a recognition unit that recognizes the plant existing around the vehicle 1.

Other Embodiments

Although multiple embodiments have been described above, the present disclosure is not construed as being limited to those embodiments, and can be applied to various embodiments and combinations within a scope that does not depart from the spirit of the present disclosure.

As a first modification, the region recognition unit 43, 243 may recognize the plant in consideration of the difference between the intensity of camera image and the intensity of reflected light image. That is, Ib in the plant recognition formula 46 may be the intensity of reflected light image. The region recognition unit 43 may generate a composite image to which both of the intensity of reflected light image and the intensity of background light image are added, and recognize the plant in consideration of the difference between the intensity of camera image and the intensity of the generated composite image.

As a second modification, the region recognition unit 43, 243 does not have to use the determination value Q calculated using the plant recognition formula 46 as the physical quantity reflecting the difference between the intensity of camera image and the intensity of sensor image. For example, the physical quantity reflecting the difference between the intensity of camera image and the intensity of sensor image may be the direct difference between the intensity of the camera image and the intensity of the sensor image acquired by, for example, subtraction. In this case, the plant recognition purpose image used in the second embodiment may be a difference image obtained based on the difference between the intensity of the camera image and the intensity of the sensor image.

As a third modification, which is a modification of the second embodiment, the plant recognition purpose image may be generated by another device other than the region recognition unit 243. For example, when the image registration unit 42 performs image registration, the image registration unit may generate the plant recognition purpose image. In this case, the region recognition unit 243 may acquire the plant recognition purpose image from the image registration unit 42.

As a fourth modification, which is a modification of the second embodiment, the data input to the object recognition model 244 does not have to be the plant recognition purpose image provided separately from the camera image. For example, an additional channel other than RGB may be prepared in the camera image, and the calculated determination value Q may be stored in the additional channel. The data input to the object recognition model 244 may be the camera image to which the additional information of the calculated determination value Q is added.

As a fifth modification 5, when the region recognition unit 43, 243 recognizes plants in consideration of the difference between the intensity of camera image and the intensity of sensor image, instead of using the semantic segmentation for object recognition, another object recognition method, such as a bounding box method may be adopted.

As a sixth modification, a recognition unit other than the region recognition unit 43, 243, which recognizes the spatial region including the object existing around the vehicle 1, may be adopted under a condition that the plants can be recognized with consideration of the difference between the intensity of camera image and the intensity of sensor image.

For example, the recognition unit may determine whether the plant is included in the measurement range MA2 of the camera image without strictly associating the plant with the spatial region and recognizing the plant.

As a seventh modification, the camera image may be a grayscale image instead of the color image described in the first embodiment.

As an eighth modification, at least one of the object recognition ECU 30 or the driving assist ECU 50 may not be equipped to the vehicle. Instead, at least one of the object recognition ECU 30 or the driving assist ECU 50 may be installed outside of the vehicle, such as on the road side or on a different vehicle. In this case, object recognition, driving operation, or the like may be remotely controlled by communication such as Internet, road-to-vehicle communication, or vehicle-to-vehicle communication.

As a ninth modification, the object recognition ECU 30 and the driving assist ECU 50 may be integrated into one to form, for example, an electronic control device that realizes complex function. For example, the distance measuring sensor 10 and the external view camera 20 may be provided by an integrated sensor unit. An object recognition apparatus such as the object recognition ECU 30 of the first embodiment may be included as a component of the integrated sensor unit.

As a tenth modification, the object recognition ECU 30 does not have to include the image registration unit 42. The object recognition ECU 30 may acquire, from another device, image registration information related to the reflected light image, the background light image, and the camera image to which the image registration has been carried out.

As an eleventh modification, the respective functions provided by the object recognition ECU 30 can be also provided by software and hardware for executing the software, only software, only hardware, and complex combinations of software and hardware. In cases where functions are provided by electronic circuits as hardware, the functions can be also provided by analog circuits or digital circuits which include a large number of logic circuits.

As a twelfth modification, the form of the storage medium for storing the object recognition program or the like that can realize the above object recognition method may be changed as appropriate. For example, the storage medium is not limited to the configuration provided on the circuit board, and may be provided in the form of a memory card or the like. The storage medium may be inserted into a slot portion, and electrically connected to the control circuit of the object recognition ECU 30. Further, the storage medium may be an optical disk or a hard disk as a copy base of the program of the object recognition ECU 30.

The processor and the method thereof which have been described in the present disclosure may be also implemented by a special purpose computer which includes a processor programmed to execute one or more functions implemented by computer programs. Alternatively, the apparatus and the method described in the present disclosure may be implemented by a special purpose hardware logic circuit. Alternatively, the apparatus and the method described in the present disclosure may be implemented by one or more special purpose computers configured by a combination of a processor executing a computer program and one or more hardware logic circuits. Further, the computer program may be stored in a computer-readable non-transitory tangible storage medium as instructions executed by a computer.

What is claimed is:

1. An object recognition apparatus recognizing an object existing around a vehicle using image information, which includes a camera image acquired from an external view camera and a sensor image acquired from a distance measuring sensor, the external view camera being equipped to the vehicle and generating the camera image by sensing incident visible light with a camera element, the distance measuring sensor being equipped to the vehicle and generating, as the sensor image, a reflected light image by emitting near-infrared light toward a peripheral area and sensing, with a light receiving element, reflected near-infrared light from the object, the distance measuring sensor further generating, as the sensor image, a background light image by sensing, with the light receiving element, near-infrared background light with respect to the reflected near-infrared light, the object recognition apparatus comprising:

an image information acquisition unit that acquires the image information of the distance measuring sensor and the image information of the external view camera; and a recognition unit that recognizes a plant existing around the vehicle with consideration of an intensity difference between an intensity of the camera image and an intensity of the sensor image, wherein the sensor image is provided by both of the reflected light image and the background light image, and the recognition unit recognizes the plant existing around the vehicle with consideration of both of (i) the intensity difference between the intensity of the camera image and an intensity of the reflected light image and (ii) the intensity difference between the intensity of the camera image and an intensity of the background light image.

2. The object recognition apparatus according to claim 1, wherein
the recognition unit:
classifies target objects included in the camera image into multiple different classes;
classifies a part of the target objects including the plant into a common class, which is one of the multiple different classes and a superordinate concept class of the plant; and
determines whether each target object included in the common class is a plant with consideration of the intensity difference.

3. The object recognition apparatus according to claim 2, wherein
the recognition unit includes an object recognition model having a neural network, and
the object recognition model performs a semantic segmentation to classify the target objects into multiple different classes.

4. The object recognition apparatus according to claim 1, wherein
the recognition unit:
acquires, based on the camera image and the sensor image, a plant recognition purpose image in which the intensity difference is reflected; and
classifies, based on the camera image and the plant recognition purpose image, the target objects included in the camera image into multiple different classes and classifies the plant into a plant class as one of the multiple different classes.

5. The object recognition apparatus according to claim 1, wherein
the recognition unit recognizes the plant based on a determination value calculated, as a physical quantity indicating the intensity difference, by a plant recognition formula, and
the plant recognition formula is defined by an intensity ratio between the intensity of the camera image and the intensity of the sensor image.

6. The object recognition apparatus according to claim 5, wherein
the image information acquisition unit acquires the image information of the camera image, which includes a wavelength characteristic of a sensitivity of the camera element, and
the recognition unit changes the plant recognition formula corresponding to the wavelength characteristic of the sensitivity of the camera element.

7. The object recognition apparatus according to claim 1, wherein
the sensor image is provided by the background light image, and
the recognition unit recognizes the plant existing around the vehicle with consideration of the intensity difference between the intensity of the camera image and an intensity of the background light image.

8. The object recognition apparatus according to claim 1, wherein
the sensor image is provided by the reflected light image, and
the recognition unit recognizes the plant existing around the vehicle with consideration of the intensity difference between the intensity of the camera image and an intensity of the reflected light image.

9. An object recognition program product stored in a computer-readable non-transitory storage medium, the program product comprising instructions to be executed by at least one processor for recognizing an object existing around a vehicle using image information, which includes a camera image acquired from an external view camera and a sensor image acquired from a distance measuring sensor, the instructions comprising:

acquiring the image information of the distance measuring sensor and the image information of the external view camera, the external view camera being equipped to the vehicle and generating the camera image by sensing incident visible light with a camera element, the distance measuring sensor being equipped to the vehicle and generating, as the sensor image, a reflected light image by emitting near-infrared light toward a peripheral area and sensing, with a light receiving element, reflected near-infrared light from the object, the distance measuring sensor further generating, as the sensor image, a background light image by sensing, with the light receiving element, near-infrared background light with respect to the reflected near-infrared light; and recognizing a plant existing around the vehicle with consideration of an intensity difference between an intensity of the camera image and an intensity of the sensor image, wherein the sensor image is provided by both of the reflected light image and the background light image, and the plant existing around the vehicle is recognized with consideration of both of (i) the intensity difference between the intensity of the camera image and an intensity of the reflected light image and (ii) the intensity difference between the intensity of the camera image and an intensity of the background light image.

10. An object recognition apparatus recognizing an object existing around a vehicle using an external view camera and a distance measuring sensor, the object recognition apparatus comprising:
- a non-transitory storage medium; and
- at least one processor, by executing instructions stored in the non-transitory storage medium, being configured to:
  - acquire, from the external view camera, image information of a camera image, the external view camera being equipped to the vehicle and generating the camera image by sensing incident visible light with a camera element;
  - acquire, from the distance measuring sensor, image information of a sensor image, the distance measuring sensor being equipped to the vehicle and generating, as the sensor image, at least one of a reflected light image or a background light image, the distance measuring sensor generating the reflected light image by emitting near-infrared light toward a peripheral area and sensing, with a light receiving element, reflected near-infrared light from the object, the distance measuring sensor generating the background light image by sensing, with the light receiving element, near-infrared background light with respect to the reflected near-infrared light; and
  - recognize a plant existing around the vehicle with consideration of an intensity difference between an intensity of the camera image and an intensity of the sensor image, wherein the sensor image is provided by both of the reflected light image and the background light image, and the plant existing around the vehicle is recognized with consideration of both of (i) the intensity difference between the intensity of the camera image and an intensity of the reflected light image and (ii) the intensity difference between the intensity of the camera image and an intensity of the background light image.

* * * * *